(12) United States Patent
Tsai et al.

(10) Patent No.: US 7,612,842 B2
(45) Date of Patent: Nov. 3, 2009

(54) OPTICAL MODULE

(75) Inventors: Yee-Hua Tsai, Hsin-Chu (TW);
Chun-Min Ko, Hsin-Chu (TW)

(73) Assignee: AU Optronics Corporation, Hsin-Chu (TW)

(*) Notice: Subject to any disclaimer, the term of this patent is extended or adjusted under 35 U.S.C. 154(b) by 65 days.

(21) Appl. No.: 11/621,144

(22) Filed: Jan. 9, 2007

(65) Prior Publication Data
US 2007/0274670 A1  Nov. 29, 2007

(30) Foreign Application Priority Data
Apr. 21, 2006  (TW) ............... 95114463 A

(51) Int. Cl.
*G02F 1/1333* (2006.01)
(52) U.S. Cl. .......... 349/58; 349/60
(58) Field of Classification Search ............. None
See application file for complete search history.

(56) References Cited

U.S. PATENT DOCUMENTS

| | | | |
|---|---|---|---|
| 6,175,396 B1 * | 1/2001 | Kim et al. ............. 349/58 |
| 6,828,721 B2 * | 12/2004 | Wakita ................. 313/491 |
| 7,360,940 B2 * | 4/2008 | Chang et al. ............ 362/631 |
| 2005/0243238 A1 * | 11/2005 | Cha et al. ............. 349/58 |
| 2006/0125981 A1 * | 6/2006 | Okuda ................. 349/110 |

FOREIGN PATENT DOCUMENTS

| | | |
|---|---|---|
| JP | 02-235022 | 9/1990 |
| JP | 06-231079 | 8/1994 |
| JP | 07-028409 | 1/1995 |

OTHER PUBLICATIONS

English Language Abstract of JP 07-028409.
English Language Abstract of JP 02-235022.
English Language Abstract of JP 06-231079.

* cited by examiner

*Primary Examiner*—Uyen Chau N Le
*Assistant Examiner*—Chad H Smith
(74) *Attorney, Agent, or Firm*—Thomas, Kayden, Horstemeyer & Risley

(57) ABSTRACT

An optical module has a support, an optical film and a buffer. The optical film has a protrusion on one edge thereof. The buffer is disposed on the support and has a corresponded notch to accommodate the protrusion.

17 Claims, 4 Drawing Sheets

OPTICAL MODULE

RELATED APPLICATIONS

The present application is based on, and claims priority from, Taiwan Patent Application Serial Number 95114463, filed Apr. 21, 2006, the disclosure of which is incorporated by reference herein in its entirety.

BACKGROUND

1. Field of Invention

The present invention relates to an optical module. More particularly, the present invention relates to an optical module using a buffer to be a fixing structure.

2. Description of Related Art

With the rapid development in technology, flat panel displays (FPD) with the advantages of high image quality, compact size, light weight, low driving voltages, and low power consumption have been widely used in electronic devices and have become the mainstream display apparatus. For example, the FPD can be introduced into a portable TV, mobile phone, video recorder, computer monitor, and many other kinds of consumer electronics.

Some issues have to be considered when designing the panel module used in the mobile phone. First of all, it is a big challenge to prevent the glass of the panel module of mobile phone from being crashed. Furthermore, the input frequency of the common voltage may result in a high-frequency vibration of the glass in the panel module. The clearance between the glass and the optical module (backlight module) or touch panel has an effect similar to resonance box that enhances the vibration and therefore makes noise. Accordingly, an ideal panel module should have high toughness to against strong impact and also the ability to absorb high-frequency vibration to minimize noise caused by the input frequency of common voltage.

FIG. 1 shows a perspective diagram of a traditional optical module. An optical film, such as a prism or a diffuser, is fixed by the notch 120 on plastic or metal support in conventional optical module 100. A light shielding material is used to assemble the LC (liquid crystal) module and the optical module. In order to generate the notch 120 on plastic or metal support in the traditional optical module 100, more time and higher cost are required when designing and manufacturing the product. Therefore, an optical module with simple design is needed to avoid the negative issue, and offer high toughness and ability to absorb high-frequency vibration.

SUMMARY

It is therefore an aspect of the present invention to provide an optical module using a buffer structure to fix the optical film, wherein the buffer structure can simplify the design and manufacture of plastic or metal support of the optical module.

According to one preferred embodiment of the present invention, the optical module has a support, an optical film and a buffer. The support has a pedestal and a sidewall. The optical film has a protrusion on one edge thereof. The buffer is disposed on the support and has a corresponded notch to accommodate the protrusion.

According to another preferred embodiment of the present invention, the optical module has a support, an optical film and a buffer. The support has a pedestal, a sidewall and a bottom board. The optical film has a protrusion. The buffer is disposed on the support and has a corresponded notch to accommodate the protrusion.

The optical module of the present invention offers simple design to reduce undesirable issues of design and manufacture, and offers high toughness to against impact and also ability to absorb high-frequency vibration.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
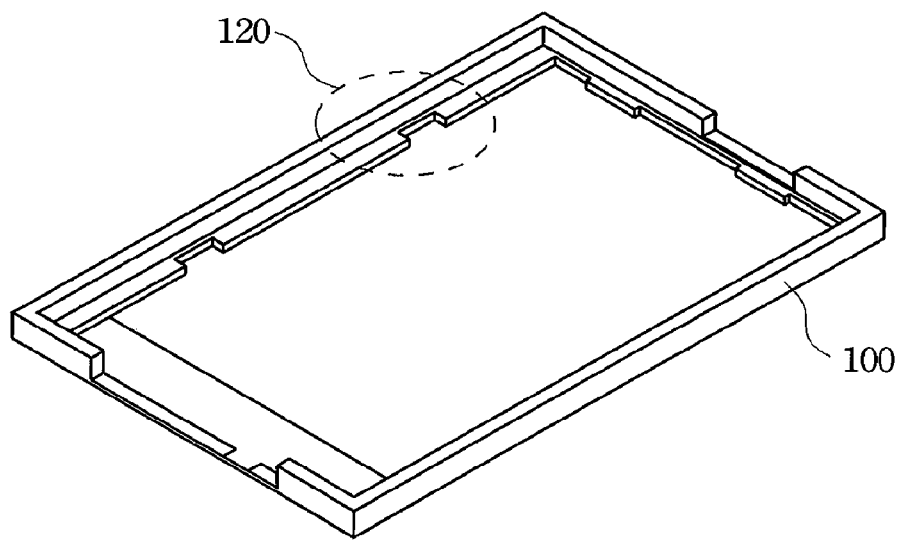
FIG. 1 shows a perspective diagram of a traditional optical module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
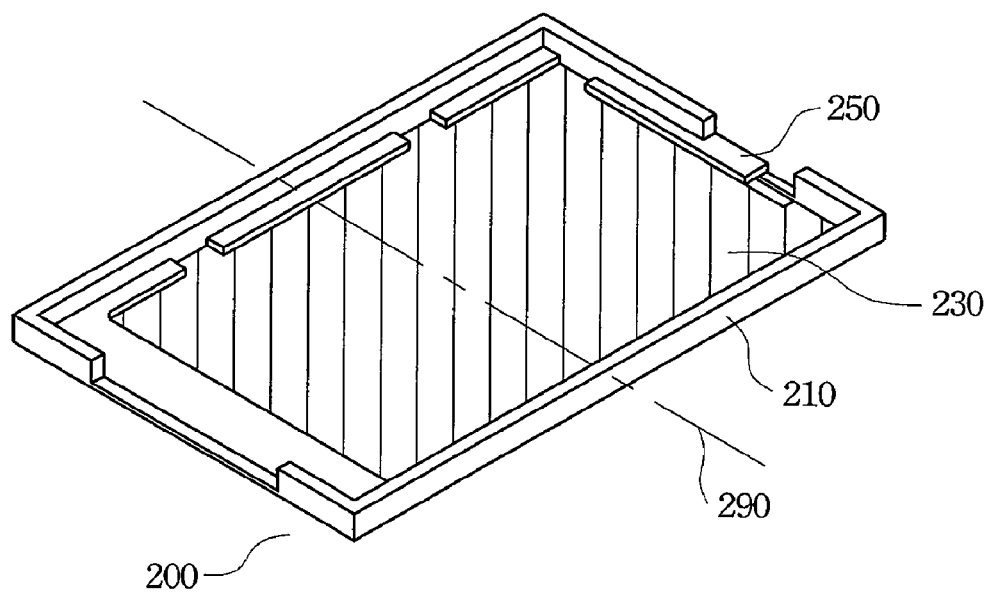
FIG. 2 shows a perspective diagram of an optical module according to a preferred embodiment of the present invention.
Figure 2A:
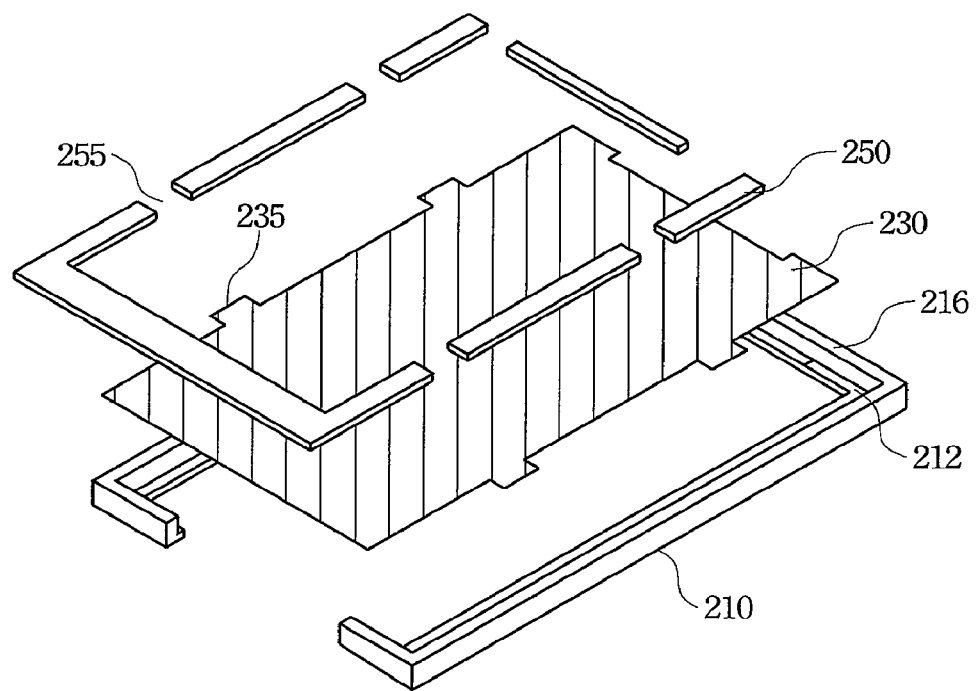
FIG. 2A shows a decomposition diagram of an optical module according to a preferred embodiment of the present invention.

FIG. 2 shows a perspective diagram of an optical module according to a preferred embodiment of the present invention. The optical module 200 is constructed of a support 210, an optical film 230 and a buffer 250. FIG. 2A shows a decomposition diagram of an optical module according to a preferred embodiment of the present invention. FIG. 2A is decomposed from the optical module 200 of FIG. 2. The optical module has a support 210, an optical film 230 and a buffer 250. The support 210 has a pedestal 212 and a sidewall 216. The optical film 230 has a protrusion 235 on one edge thereof. The buffer 250 is disposed on the pedestal 212 and has a corresponded notch 255 to accommodate the protrusion 235. The support 210 has generally uniform thickness, and is varied in shape. For example, when the support 210 is a flat plank or a frame, the cross section 290 of the support 210 in FIG. 2 is a rectangle.

The buffer 250 comprises several disconnected portions, and the notch 255 is constructed of two adjacent disconnected portions. Designer can decide the shape and the material of the buffer 250 according to the demand of noise insulation or the shape and amount of the optical film 230. The support 210 can offer high toughness to against impact. The buffer 250 can offer the ability to absorb high-frequency vibration to avoid the noise caused by the input frequency of the common voltage.

Figure 2B:
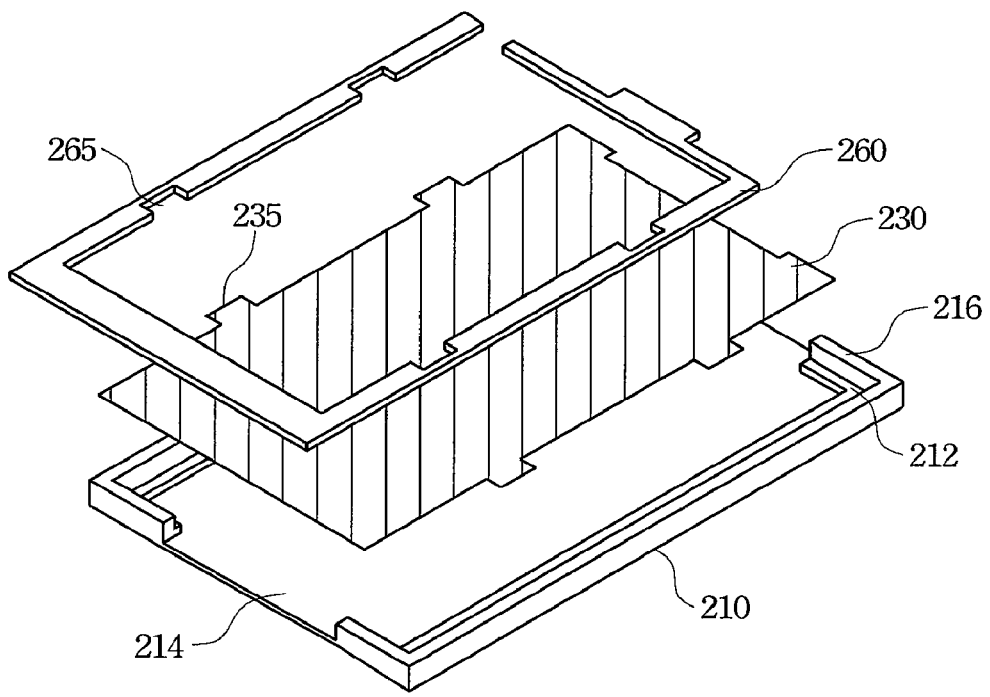
FIG. 2B shows a decomposition diagram of an optical module according to another preferred embodiment of the present invention.

FIG. 2B shows a decomposition diagram of an optical module according to another preferred embodiment of the present invention. The optical module has a support 210, an optical film 230 and a buffer 260. The support 210 has a pedestal 212, a sidewall 216 and a bottom board 214. The optical film 230 has at least one protrusion 235. The buffer 260 is disposed on the pedestal 212 and has at least one corresponded notch 265 to accommodate the protrusion 235. Same as the embodiment of FIG. 2A, the support 210 has generally uniform thickness, and is varied in shape. For example, when the support 210 is constructed of the pedestal 212 and the bottom board 214, the cross section of the support 210 is L shape. Otherwise, when the support 210 is constructed of the pedestal 212, the bottom board 214 and the sidewall 216, the cross section of the support 210 is a ladder shape.

The difference between the notch 265 of the buffer 260 in this embodiment and the notch 255 of FIG. 2A is that the notch 265 is formed on the sidewall of the buffer 260. Designer can decide the shape and the material of the buffer 260 according to the demand of noise insulation or the shape and amount of the optical film 230. The buffer 260 can be a one-body structure instead of comprising several objects to save the time of mold developing, and to reduce the time of optical module assembling as well as labor cost.

Figure 2C:
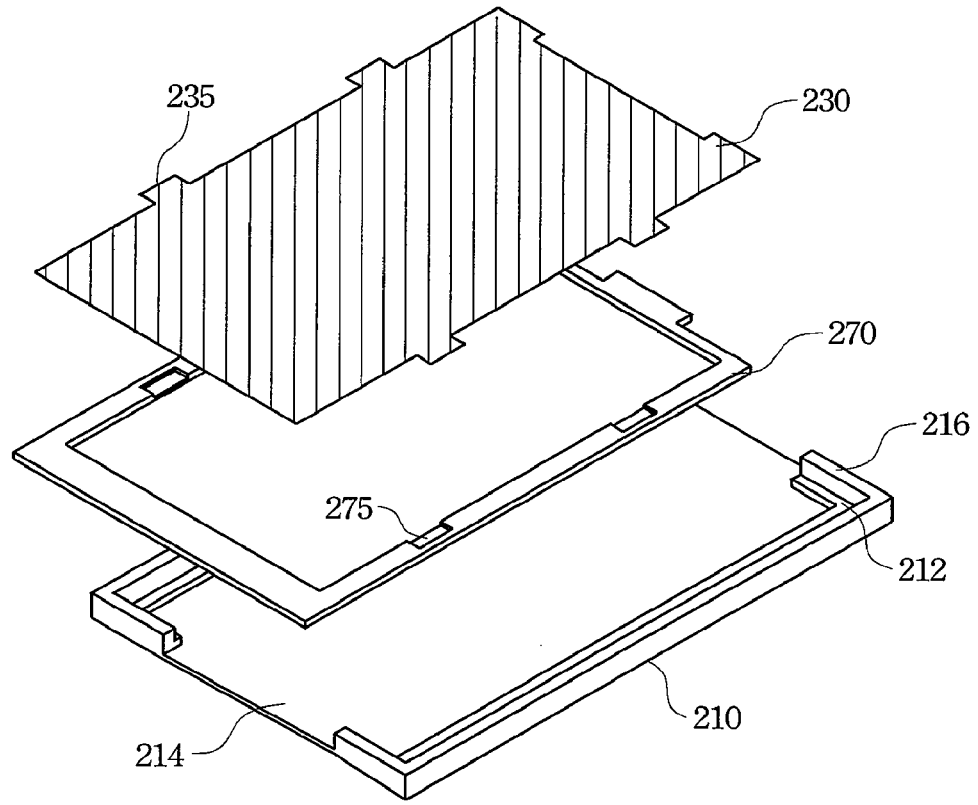
FIG. 2C shows a decomposition diagram of an optical module according to another preferred embodiment of the present invention.

FIG. 2C shows a decomposition diagram of an optical module according to another preferred embodiment of the present invention. The buffer 260 and the notch 265 of FIG. 2B are respectively deformed to be the buffer 270 and the notch 275 of FIG. 2C. In the embodiment of the FIG. 2C, the notch 275 is formed on the top surface of the buffer 270. Therefore, the buffer 270 placed above the pedestal 212 can fix the optical film 230.

Figure 2D:
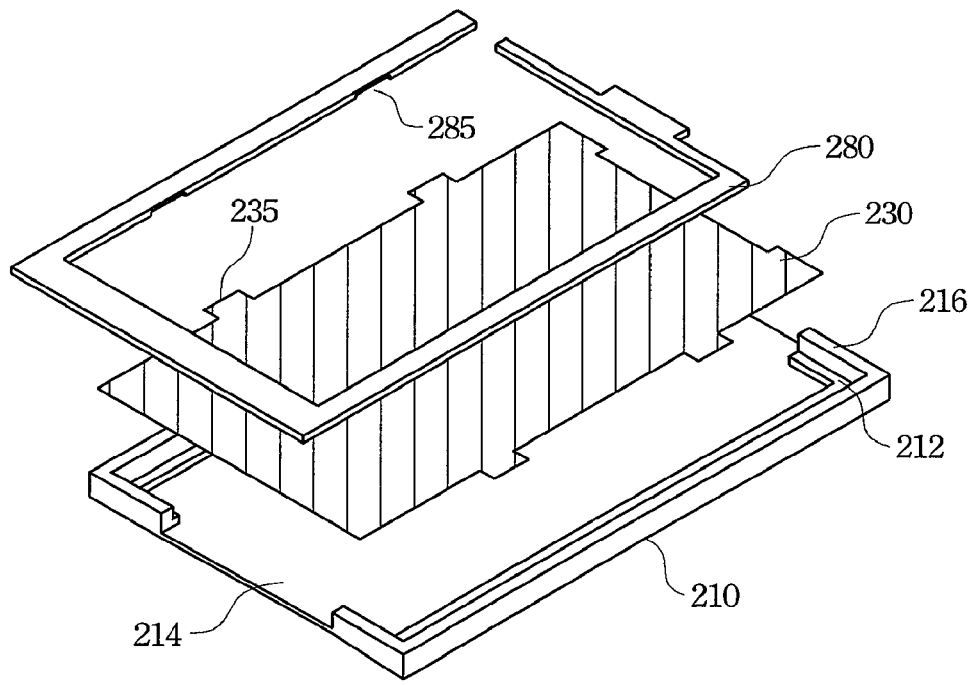
FIG. 2D shows a decomposition diagram of an optical module according to another preferred embodiment of the present invention.

FIG. 2D shows a decomposition diagram of an optical module according to another preferred embodiment of the present invention. The buffer 260 and the notch 265 of FIG. 2B are respectively deformed to be the buffer 280 and the notch 285 of FIG. 2D. In the embodiment of the FIG. 2D, the notch 285 is formed on the bottom surface of the buffer 280. Therefore, the buffer 280 placed above the pedestal 212 can fix the optical film 230.

Figure 3A:
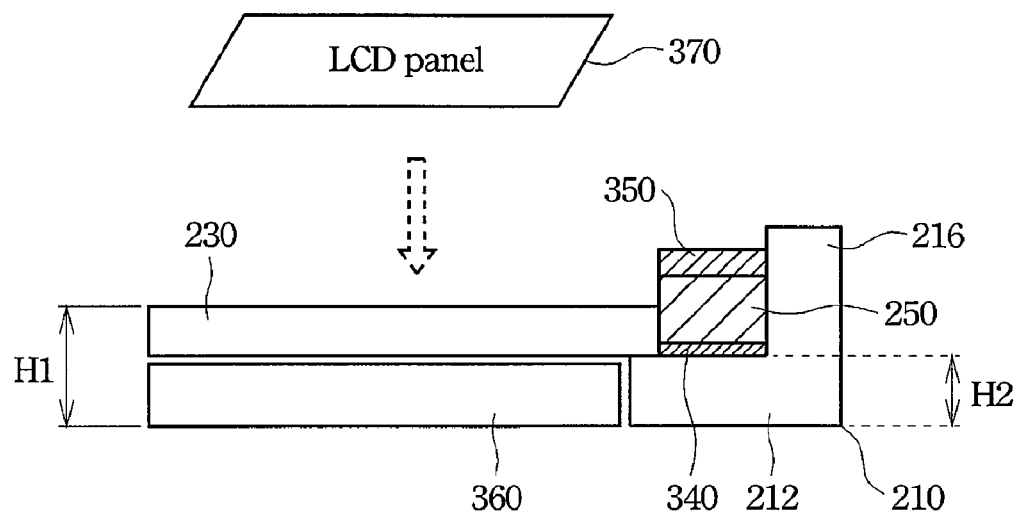
FIG. 3A shows a cross section diagram of an optical module according to a preferred embodiment of the present invention.

FIG. 3A shows a cross section diagram of an optical module according to a preferred embodiment of the present invention. This figure is obtained from the cross section 290 in FIG. 2 together with the buffer 250 having disconnected structure in FIG. 2A. The buffer 250 with disconnected structure can be replaced by the buffer 260 with one-body structure in FIG. 2B. The optical module has a support 210, an optical film 230 and a buffer 250. The support 210 has a pedestal 212 and a sidewall 216. The sidewall 216 is disposed on the pedestal 212. The pedestal 212 has generally uniform thickness to reduce the developing time and simplify the assembling process. The height and thickness of the sidewall 216 is predetermined to obtain good property to protect the optical film 230 and the buffer 250 inside the sidewall 216.

The preferred embodiment of the present invention further has an adhesion layer 340 interposed between the pedestal 212 and the buffer 250 to adhere the buffer 250 to the support 210 for fixing the optical film 230. Furthermore, the preferred embodiment of the present invention further has a light shielding material 350 on the buffer 250 to prevent light leakage of the optical module and assemble the optical module and a LCD (liquid crystal display) panel 370 above the optical film 230. The optical module further has a light guide 360 below the optical film 230, wherein the total thickness (H1) of the light guide 360 and the optical film 230 is greater than or equal to the thickness (H2) of the pedestal 212. Therefore, the buffer 250 placed above the pedestal 212 can fix the optical film 230.

Figure 3B:
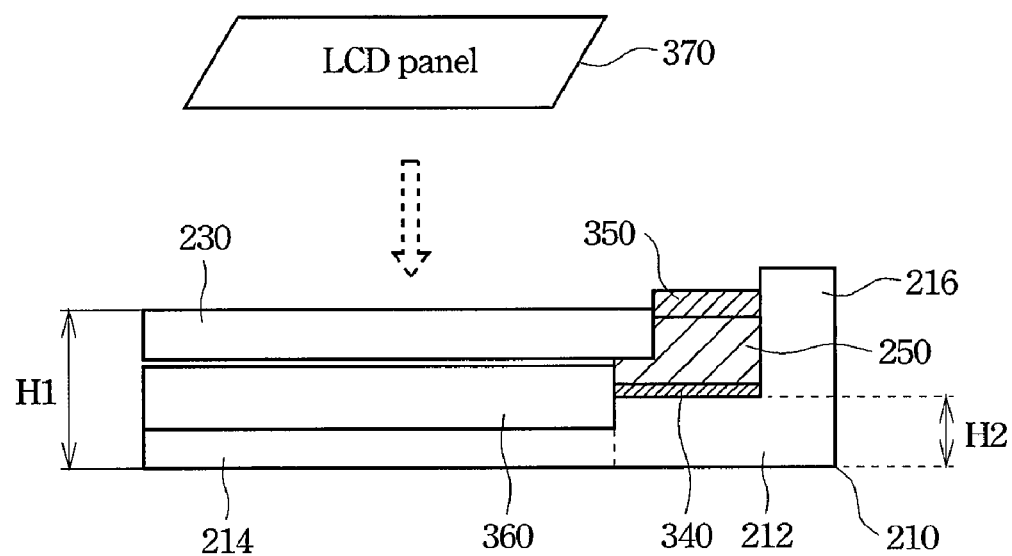
FIG. 3B shows a cross section diagram of an optical module according to another preferred embodiment of the present invention.

FIG. 3B shows a cross section diagram of an optical module according to another preferred embodiment of the present invention. This figure is obtained from the cross section 290 in FIG. 2 together with the buffer 250 having disconnected structure in FIG. 2A. The buffer 250 with disconnected structure can be replaced by the buffer 260 with one-body structure in FIG. 2B. The optical module has a support 210, an optical film 230 and a buffer 250. The support 210 has a pedestal 212, a sidewall 216 and a bottom board 214. The sidewall 216 is disposed on the pedestal 212. The pedestal 212 has generally uniform thickness to reduce the mold developing time and simplify the assembling process. The height and thickness of the sidewall 216 is predetermined to obtain good material property to protect the optical film 230 and the buffer 250 inside the sidewall 216.

The preferred embodiment of the present invention further has an adhesion layer 340 interposed between the pedestal 212 and the buffer 250 to adhere the buffer 250 to the support 210 for fixing the optical film 230. Furthermore, the preferred embodiment of the present invention further has a light shielding material 350 on the buffer 250 to prevent light leakage of the optical module and assemble the optical module and a LCD panel 370 above the optical film 230. The optical module further has a light guide 360 below the optical film 230, wherein the total thickness (H1) of the light guide 360, the optical film 230 and the bottom board 214 is greater than or equal to the thickness (H2) of the pedestal 212. Therefore, the buffer 250 placed above the pedestal 212 can fix the optical film 230.

The embodiments of the present invention use the buffer to replace the notch structure of plastic or metal support and to fix the optical film. Meanwhile, the buffers of the embodiments offer high toughness to against strong impact and ability to absorb high-frequency vibration to prevent noise caused by the input frequency of the common voltage.

Generally speaking, the material of the buffer in the present invention is to improve toughness to against impact. The buffer has generally uniform thickness, and the thickness can also be varied to meet the requirement of specific material property.

Moreover, when the defect occurs during the assembling process, we just need to replace undesirable pieces of the buffer with disconnected structure rather than the whole buffer. Thus, material cost can be reduced and rework efficiency can be increased. Otherwise, when the design of the optical module or LC module needs to be changed, we don't need to change the design of the optical film and the plastic or metal support. We just need to change the design of the buffer to meet the requirement of assembling and this offers very good design flexibility.

Although the present invention is illustrated by the example of mobile phones, the design of the invention can be applied to other kinds of optical module structures.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical module, comprising:
   a support having a sidewall, wherein the support further comprises a pedestal and a bottom board;
   an optical film disposed on the support and having a protrusion on one edge thereof; and
   a buffer, disposed on the support, having a corresponding notch to accommodate the protrusion, wherein the buffer surrounds the optical film and the sidewall surrounds the buffer and the optical film.

2. The optical module as claimed in claim 1, wherein the support has a generally uniform thickness.

3. The optical module as claimed in claim 1, wherein the support is a flat plank.

4. The optical module as claimed in claim 1, wherein the support is a frame.

5. The optical module as claimed in claim 1, wherein cross-section of the support is a rectangle, an L shape, or a ladder shape.

6. The optical module as claimed in claim 1, wherein the buffer comprises a plurality of disconnected portions, and the notch is constructed of two adjacent disconnected portions.

7. The optical module as claimed in claim 1, wherein the buffer comprises a sidewall, and the notch is formed on the sidewall of the buffer.

8. The optical module as claimed in claim 1, wherein the buffer comprises a top surface, and the notch is formed on the top surface of the buffer.

9. The optical module as claimed in claim 1, wherein the buffer comprises a bottom surface, and the notch is formed on the bottom surface of the buffer.

10. The optical module as claimed in claim 1, further comprising an adhesion layer interposed between the support and the buffer.

11. The optical module as claimed in claim 1, further comprising a light shielding material configured on the buffer.

12. The optical module as claimed in claim 2, further comprising a light guide, wherein the total thickness of the light guide and the optical film is greater than or equal to the thickness of the support.

13. The optical module as claimed in claim 3, further comprising a light guide, wherein the total thickness of the light guide and the optical film is greater than or equal to the thickness of the support.

14. The optical module as claimed in claim 4, further comprising a light guide, wherein the total thickness of the light guide and the optical film is greater than or equal to the thickness of the support.

15. The optical module as claimed in claim 1, further comprising a light guide, wherein the total thickness of the light guide and the optical film is greater than or equal to the thickness of the support.

16. A liquid crystal display panel, comprising the optical module as claimed in claim 1.

17. An optical module, comprising:
    a support having a sidewall;
    an optical film disposed on the support and having a protrusion on one edge thereof; and
    a buffer, disposed on the support, having a corresponding notch to accommodate the protrusion, wherein the buffer surrounds the optical film and the sidewall surrounds the buffer and the optical film, wherein the buffer comprises a plurality of disconnected portions, and the notch is constructed of two adjacent disconnected portions.

* * * * *